United States Patent [19]

Bulwidas, Jr., John J.

[11] 4,227,066
[45] Oct. 7, 1980

[54] HAND-OPERATED REMOTE CONTROL UNIT AND MOUNTING STRUCTURE FOR AN ARC WELDING MACHINE

[76] Inventor: Bulwidas, Jr., John J., Jeremiah Rd. - R.D. #3, Sandy Hook, Conn. 06482

[21] Appl. No.: 11,314

[22] Filed: Feb. 12, 1979

[51] Int. Cl.³ .............................................. B23K 9/10
[52] U.S. Cl. .................................. 219/132; 338/198
[58] Field of Search ................. 219/132, 136; 338/198

[56] References Cited

U.S. PATENT DOCUMENTS

| | | | |
|---|---|---|---|
| 1,559,427 | 10/1925 | Hemphill | 338/198 |
| 2,383,725 | 8/1945 | Landis et al. | 219/132 |
| 2,642,515 | 6/1953 | Bagg | 219/132 |
| 2,658,132 | 11/1953 | Welch | 219/132 |
| 2,686,239 | 8/1954 | Burbeck | 219/132 |
| 2,788,424 | 4/1957 | Huelskamp et al. | 338/198 |
| 2,872,566 | 2/1959 | Leppala | 219/132 |
| 3,402,341 | 9/1968 | Cook | 219/132 |
| 3,581,051 | 5/1971 | Brown | 219/132 |
| 3,609,291 | 9/1971 | Pilia et al. | 219/132 |
| 3,968,341 | 7/1976 | Manning | 219/132 |
| 4,051,344 | 9/1977 | Robbins | 219/132 |
| 4,087,776 | 5/1978 | Donato | 338/198 |

Primary Examiner—B. A. Reynolds
Assistant Examiner—Clifford C. Shaw
Attorney, Agent, or Firm—Joseph Levinson

[57] ABSTRACT

A hand-operated remote control unit has a housing containing a rotary potentiometer whose shaft carries a pinion which is driven by a rack having a spring loaded push button attached thereto. An eccentric cam is mounted on the potentiometer shaft adjacent a microswitch in which the cam surface is in contact with the switch when the push button is in its unactuated position. When the push button is actuated, the cam rotates releasing the switch, and the rack and pinion varies the resistance of the potentiometer to vary the welding current. A plurality of hat section holders are positioned on different surfaces of the housing for mounting an adjustable ring-shaped clamp having bayonet extensions thereon which fit into the hat section holders. The adjustable ring-shaped clamp which has a set screw therein is adapted to be adjustably mounted on the handle of the welding torch. The adjustable clamp may be moved up and down to a desired position on the welding torch and the welding torch may be rotated 360° therein. The plurality of hat section mounts into which the clamp fits permits further adjustment and placement of the welding torch to adapt it to reach difficult places and at the same time permit operation of the push button with various digits of the hands. Accordingly, finger tip control of the welding current is achieved without the necessity of moving the torch even while wearing bulky insulating gloves.

5 Claims, 8 Drawing Figures

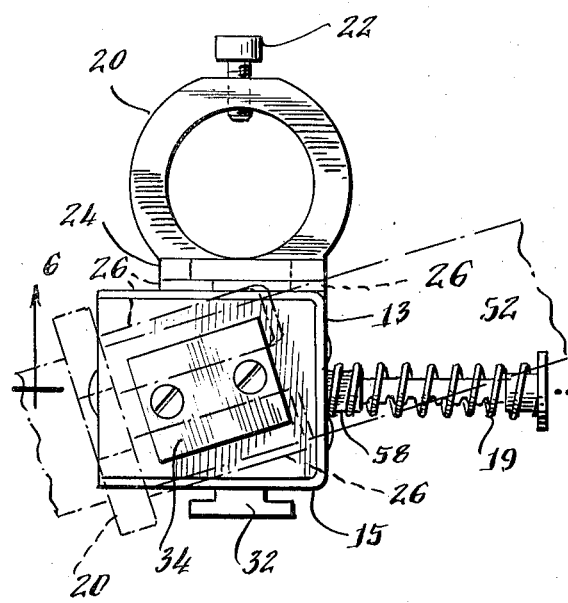
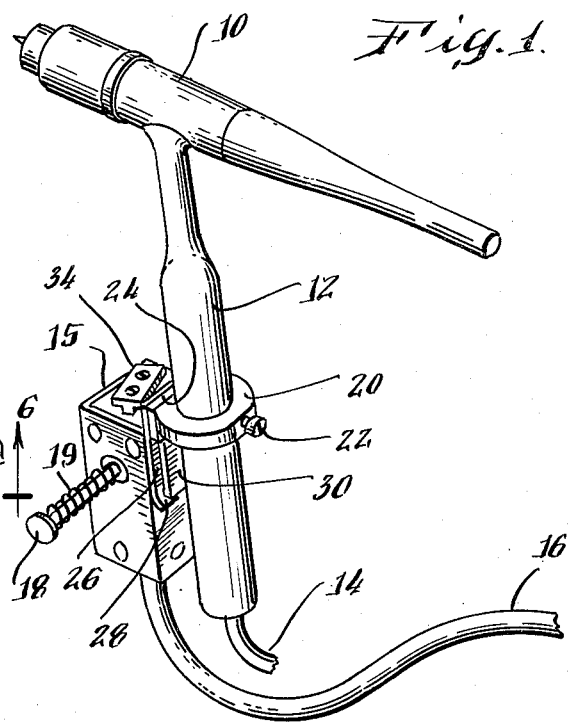
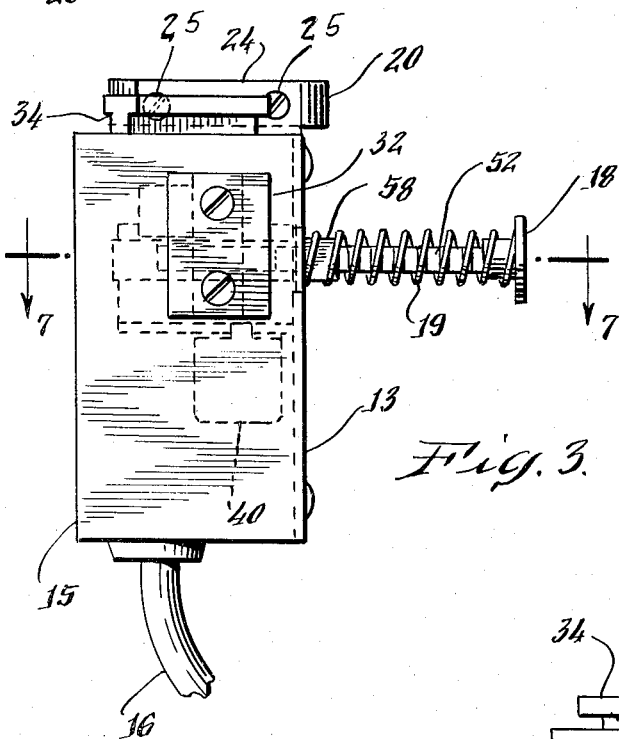
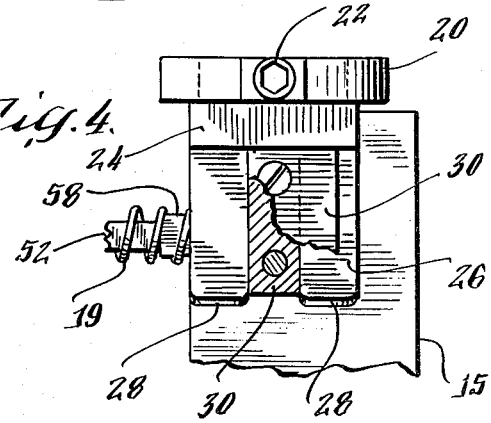
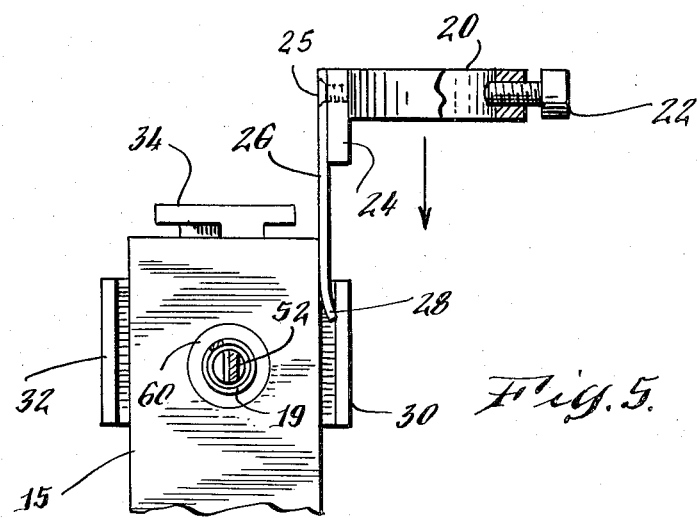

HAND-OPERATED REMOTE CONTROL UNIT AND MOUNTING STRUCTURE FOR AN ARC WELDING MACHINE

BACKGROUND OF THE INVENTION

This invention relates to a hand-operated remote control unit for controlling the welding current of a welding machine, and more particularly to such a device in which a single push button activates and controls the current of a welding machine with a universal mounting structure which permits the positioning of the welding torch in a variety of positions and permits the push button to be easily operated with different digits of the hand without effecting the welding operations being performed.

A number of prior art devices have been disclosed which utilize remote control means for controlling the welding current of a welding torch without resorting to returning to the welding console for such an adjustment. Two of the more recent patents dealing with this problem are U.S. Pat. No. 3,968,341 and U.S. Pat. No. 4,051,344 include on-off switches and linearly actuated controls for varying the resistance of a potentiometer to vary the current supplied to a welding torch. Both devices are hand-held and thumb operated. The problem with this type of operation is that the thumb is better used for support than for control because the thumb has less sensitivity to touch than the other digits of the hand. Further, using linear operation requires pressure on the handle which tends to move the torch and changes its position with respect to the workpiece thereby producing a faulty weld. In U.S. Pat. No. 3,968,341, the control is actually mounted in the handle and accordingly the positioning of the welding torch is limited since the thumb must be positioned on the actuating control. In U.S. Pat. No. 4,051,344, the control unit is strapped to the welding torch again restricting movement in all but a rotational sense.

SUMMARY OF THE INVENTION

It is an object of the present invention to provide an improved hand-operated remote control unit and mounting structure for an electric welding torch which is simple in construction and easily operated by various digits of the hand without changing the relative position between the torch and the work surface.

Another object of this invention is to provide a new and improved hand-operated remote control unit and mounting structure for an electric welding torch which provides almost universal positioning of a welding torch on the unit to permit the torch to be used in difficult locations which does not detract from the ease of control provided by the unit.

In carrying out this invention in one illustrative embodiment thereof, a hand-held remote control unit and mounting structure for an electric welding torch is provided having a rotary potentiometer with a rotatable shaft extending therefrom which carries a pinion and an eccentric cam. A spring loaded push button is attached to a rack which drives the pinion thereby varying the resistance of the potentiometer as well as rotating the eccentric cam which normally rests on a microswitch. On actuation of the push button, the switch is actuated and the resistance of the potentiometer varied in accordance with the amount of depression of the push button. A rectangular housing is provided for the unit which carries a plurality of holder means on different locations on the housing which hold an adjustable ring-shaped clamp. The clamp is adapted to be adjustably mounted on the handle of the welding torch. By moving the clamp to various positions on the handle and by positioning the clamp in the various holders on the housing a wide variety of positions are provided for the torch any of which permit the push button to be actuated by any of the several digits of the hand. The rack and pinion control of the potentiometer as well as the on-off switch provide a more easily operable control permitting the relative maintenance of the positions between the torch and the work surface.

BRIEF DESCRIPTION OF THE DRAWINGS

The invention, together with further objects and advantages thereof, will be best understood from the following description taken in connection with the accompanying drawings, in which:

FIG. 1 is a perspective view of the hand-operated remote control unit and mounting structure embodied in this invention showing a welding torch mounted in one position therein.

FIG. 2 is a top view of the remote control unit and mounting structure of FIG. 1 with the welding torch removed.

FIG. 3 is a side elevational view of FIG. 2.

FIG. 4 is a partial view of the other side of FIG. 2.

FIG. 5 is a front view of FIG. 1 with the torch removed.

DESCRIPTION OF THE PREFERRED EMBODIMENTS

Figure 6:
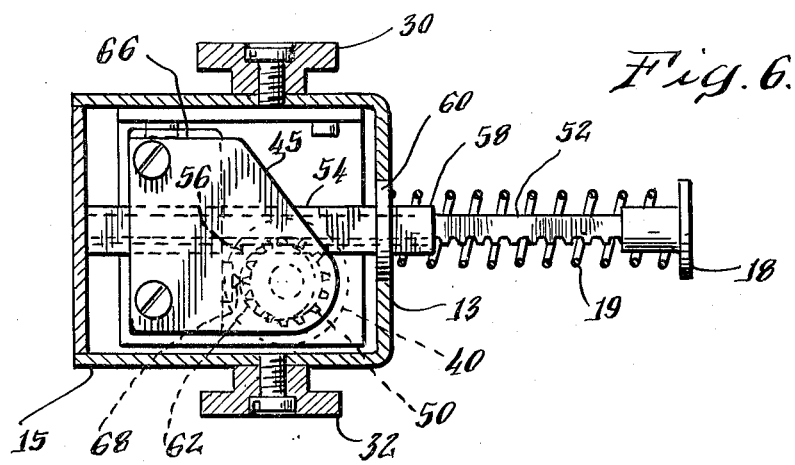
FIG. 6 is a cross-sectional view taken along line 6—6 of FIG. 2.

Referring now to FIG. 1, the hand-operated remote control unit and mounting structure on an electric welding torch is referred to generally with the reference character 15. The housing for the remote control unit 15 is rectangular and has mounted thereon on different outer surfaces thereof a plurality of holders referred to as hat section holders 30, 32 and 34 as is best shown in FIG. 5. The upper hat section holder 34 is angularly mounted with respect to the upper surface of the remote control unit 15 for a purpose which will be described hereinafter.

An adjustable ring-shaped clamp 20 is adapted to secure the unit 15 to the handle 12 of an electric welding torch 10. The electric welding torch is conventional and may be of any suitable type as such as those manufactured by Union Carbide Corporation. The ring-shaped clamp 20 is adjustable on the handle 12 by a set screw 22. As will best be seen in FIGS. 4 and 5, the ring-shaped clamp 20 has attached thereto a mounting plate 24 and a U-shaped member 26 by screws 25. The U-shaped member has legs 28 which are bent inward toward the ring-shaped clamp on the outer extremities thereof. The legs 28 are adapted for a bayonet fit into the hat section holders 30, 32 and 34. The bent ends of the legs 28 facilitate the holding of the adjustable ring-shaped clamp 20 in the hat section holders 30, 32 and 34.

Figure 7:
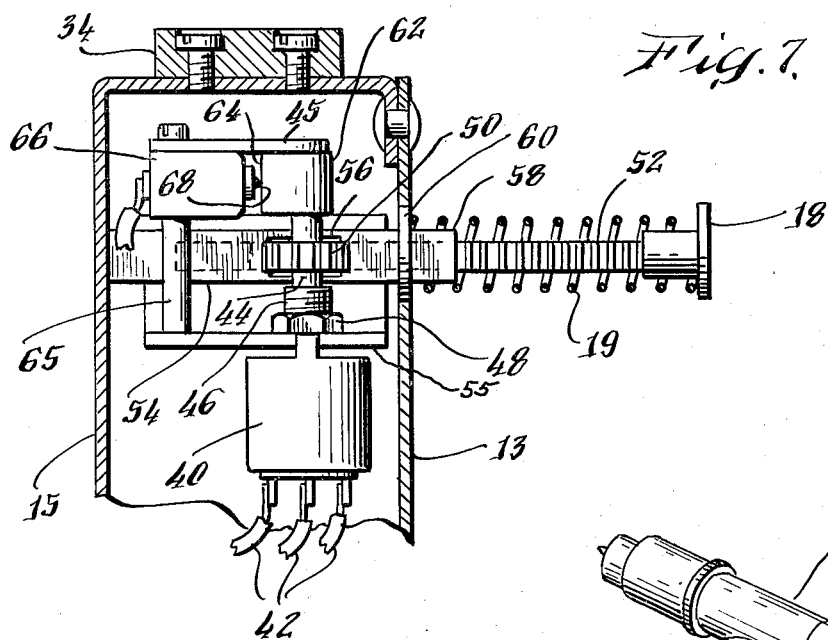
FIG. 7 is a cross-sectional view taken along line 7—7 of FIG. 3.

The remote control unit 15 is operated by push button 18. As will best be seen on FIGS. 6 and 7, the push button is attached to a rack 52 which moves in a rack housing 54. The rack housing 54 on one extremity thereof contains a sleeve 58 and an annular flange 60 for accommodating a return spring 19 which is also positioned thereon and retained by the push button 18. This return spring 19 always biases the push button outward, and in the absence of an external force always returns the push button 18 to an inactivated position.

The rectangular housing 13 of the remote control unit 15 has an L-shaped bracket 55 mounted thereon which carries the rack housing 54. A rotary potentiometer 40 is mounted to the L-shaped bracket 55 by a threaded sleeve 46 and a cooperating nut 48. The variable potentiometer has a shaft 44 carrying a pinion 50 and an eccentric cam 62. The shaft 44 is supported in a bearing plate 45. The pinion 50 is driven by the rack 52 on the actuation of the push button 18.

The eccentric cam 62 carried on the potentiometer shaft 44 bears on a contact 68 of a microswitch 66 which is also mounted to the L-shaped bracket 55 through spacers 65.

In the absence of actuation of the push button 18, the cam surface 64 of eccentric cam 62 bears on the contact 68 of the microswitch 66 which thereby maintains the microswitch in an open position, and therefore control unit 15 is inactivated. However, when the push button is depressed, the eccentric cam 62 is rotated since the potentiometer shaft 44 is rotated by rack and pinion action thereby removing the cam surface 64 from the contact 68 which closes the microswitch 66. Accordingly, initial movement of the push button 18 closes the microswitch 66 thereby activating the remote control unit 15. By increasing the downward movement on the push button the resistance of the potentiometer 40 is varied increasing the weld current at the torch 10 up to the maximum setting which has been dialed into the welding machine console (not shown) to which the remote unit is attached. Release of the push button 18 returns the unit to its inactive position by the action of return spring 19.

The remote control unit 15 is particularly suited for attachment to Hobart Model CT-300 AC/DC with all series programmers which units are generally provided with a foot control. It should be appreciated, however, that the unit 15 may be attached to other types of welding consoles. For attachment to the welding console referred to the potentiometer may have a maximum resistance of 20,000 to 25,000 ohms.

Figure 8:
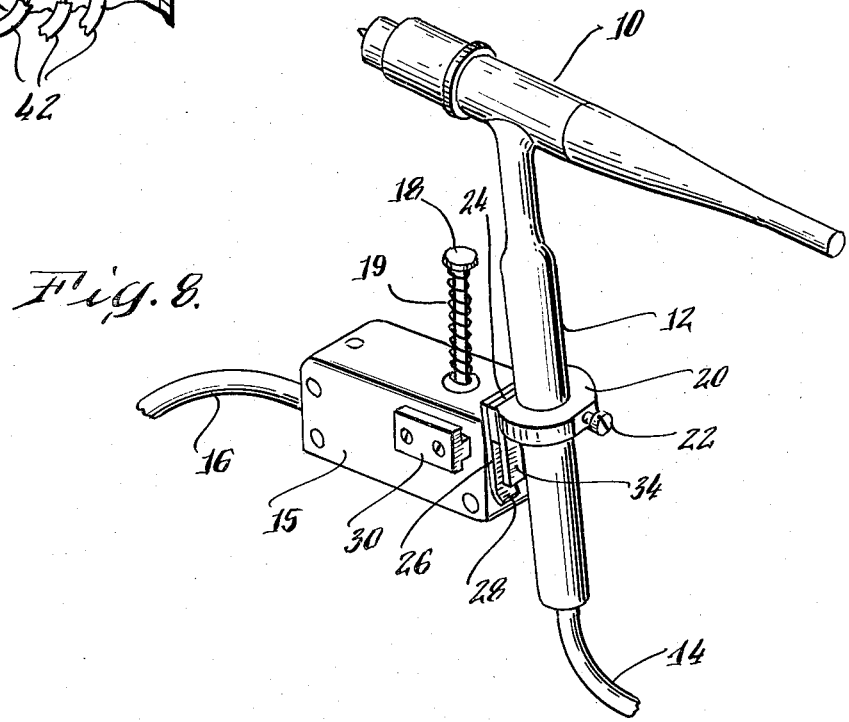
FIG. 8 is another perspective view of the hand-operated remote control unit and mounting structure illustrating the welding torch mounted to a holder on a different surface of the unit than is shown in FIG. 1.

A major advantage of the present invention resides in the flexibility of mounting the unit 15 in different positions with respect to the torch so that it may be easily operated using different digits of the hand without the loss of control or sensitivity. FIG. 8 illustrates this flexibility with the adjustable ring 20 positioned on the handle 12 of the torch 10, the torch being mounted in the angle hat section holder 34 with the push button extending toward the torch. By gripping the handle 12 and unit 15 with the hand in various positions thereon depending on the surface that the weld is to be made, e.g. vertical or horizontal, the push button may be easily operated using the thumb or one of the fingers while maintaining firm control over the handle 12 with the remainder of the digits not used in operating the push button.

By providing holders on different surfaces of the rectangular housing 13 along with being able to rotate the torch 360° within the adjustable ring-shaped clamp as well as being able to move the clamp 22 up and down on the handle, a wide variety of positions are provided which will permit the torch to be utilized in difficult, hard to reach work surfaces. Furthermore, the rack and pinion adjustment of the potentiometer allows operation by different digits of the hand including the thumb which do not place undue pressure on the torch which would vary the relative positions between the torch and the work surface. The ease of actuation by the different digits of the hand is particularly important since the operator generally will be wearing heavy gloves providing the user with very little touch which would be required if linear actuated potentiometers are utilized.

The remote control unit and mounting structure in accordance with this invention is compact, and it is not necessary to disassemble or otherwise modify the torch in order to mount the unit on it. As pointed out previously, the unit is almost universally adjustable on the torch which also permits the wires 16 and conduits 14 extending from the control unit and the torch to the console to be kept out of the way during the welding operation.

Since other modifications and changes varied to fit particular operating requirements and environments will be apparent to those skilled in the art, the invention is not considered limited to the examples chosen for purposes of illustration and covers all modifications and changes which do not constitute departures from the true spirit and scope of this invention.

What is claimed is:

1. A hand-operated remote control unit and mounting structure for an electric welding torch comprising:
   (a) a rotary potentiometer having a rotatable shaft extending therefrom,
   (b) a pinion mounted on said rotatable shaft,
   (c) a rack having said pinion coupled thereto,
   (d) a switch element coupled to said rotatable shaft which normally is in an off-position being activated to an on-position when said rotatable shaft is activated,
   (e) a spring loaded push button attached to said rack adapted to be actuated by a digit of the hand of the user for linearly moving said rack thereby rotating said pinion and said shaft for operating said switch element to an on-position and varying the resistance of said potentiometer,
   (f) a rectangular housing having said potentiometer, said rack and pinion, and said switch elements mounted therein with said spring loaded push button extending therefrom, and
   (g) mounting means on said housing for holding an electric welding torch, said mounting means including a holder mounted on said housing, and an adjustable ring-shaped clamp adapted to adjustably hold the handle of an electric welding torch, said adjustable clamp being held in said holder.

2. The hand-operated remote control unit and mounting structure set forth in claim 1 in which said holder is a hat section and said adjustable ring-shaped clamp has a bayonet means extending therefrom which fits in said hat section of said holder for mounting the electric welding torch on said housing.

3. The hand-operated remote control unit and mounting structure set forth in claim 1 having a plurality of holders mounted on different surfaces of said housing for positioning said adjustable clamp on different surfaces of said housing.

4. The hand-operated remote control unit and mounting structure set forth in claim 3 in which at least one of said holders is angularly mounted with respect to at least one surface of said housing.

5. The hand-operated remote control unit and mounting structure set forth in claim 1 wherein said switch element is controlled by an eccentric cam mounted on said rotatable shaft adjacent said switch element and normally contacting said switch element, said eccentric cam on the rotation of said shaft being disengaged from said switch element thereby activating said switch element to an on-position.

* * * * *